United States Patent [19]

Heil et al.

[11] Patent Number: 4,543,383

[45] Date of Patent: Sep. 24, 1985

[54] IMPACT RESISTANT RESINS AND METHOD FOR MAKING THE SAME

[75] Inventors: Ernst Heil, Stockstadt; Franz Wenzel, Darmstadt; Peter J. Arndt, Seeheim-Jugenheim; Walter Schellhaas, Zwingenberg, all of Fed. Rep. of Germany

[73] Assignee: Röhm GmbH, Darmstadt, Fed. Rep. of Germany

[21] Appl. No.: 684,179

[22] Filed: Dec. 21, 1984

Related U.S. Application Data

[63] Continuation of Ser. No. 407,913, Aug. 13, 1982, abandoned, which is a continuation-in-part of Ser. No. 209,516, Nov. 24, 1980, abandoned.

[30] Foreign Application Priority Data

Dec. 19, 1979 [DE] Fed. Rep. of Germany ....... 2951045

[51] Int. Cl.⁴ ............................................ C08F 265/06
[52] U.S. Cl. ................................... 524/458; 525/305; 525/902; 525/309
[58] Field of Search ................ 524/458, 460; 525/305, 525/902

[56] References Cited

U.S. PATENT DOCUMENTS

| | | | |
|---|---|---|---|
| 3,655,826 | 4/1972 | Fellman et al. | 260/876 R |
| 3,661,994 | 5/1972 | Hwa | 260/879 |
| 3,787,522 | 1/1974 | Dickie | 260/836 |
| 3,793,402 | 2/1974 | Owens | 260/876 |
| 3,971,835 | 7/1976 | Myers | 260/876 |
| 4,052,525 | 10/1977 | Ide | 428/412 |

FOREIGN PATENT DOCUMENTS

| | | |
|---|---|---|
| 2044867 | 5/1971 | Fed. Rep. of Germany . |
| 2069007 | 9/1971 | France . |
| 1117124 | 6/1968 | United Kingdom . |
| 1324190 | 7/1973 | United Kingdom . |

OTHER PUBLICATIONS

Plastics Handbook, (vol. IX), "Polymethacrylate", Carl Hanser Verlag, Munich, 1975 (pp. 333–339).

*Primary Examiner*—Paul R. Michl
*Attorney, Agent, or Firm*—Curtis, Morris & Safford

[57] ABSTRACT

What are disclosed are a continuous emulsion polymerization method for making an aqueous dispersion of an impact resistant resin, adaptable to use as a component of impact resistant polymethacrylate forming masses, by first emulsion polymerizing a first monomer component onto core particles of a seed latex until a degree of polymerization of said monomers from 80 to 95 percent is attained, whereby an intermediate product comprising said core particles covered with a rubbery polymer phase is obtained, and then emulsion polymerizing a second monomer component onto the particles of said intermediate product to form a shell of harder polymer on the particles of said intermediate product, and impact resistant resin products made by this method.

7 Claims, 1 Drawing Figure

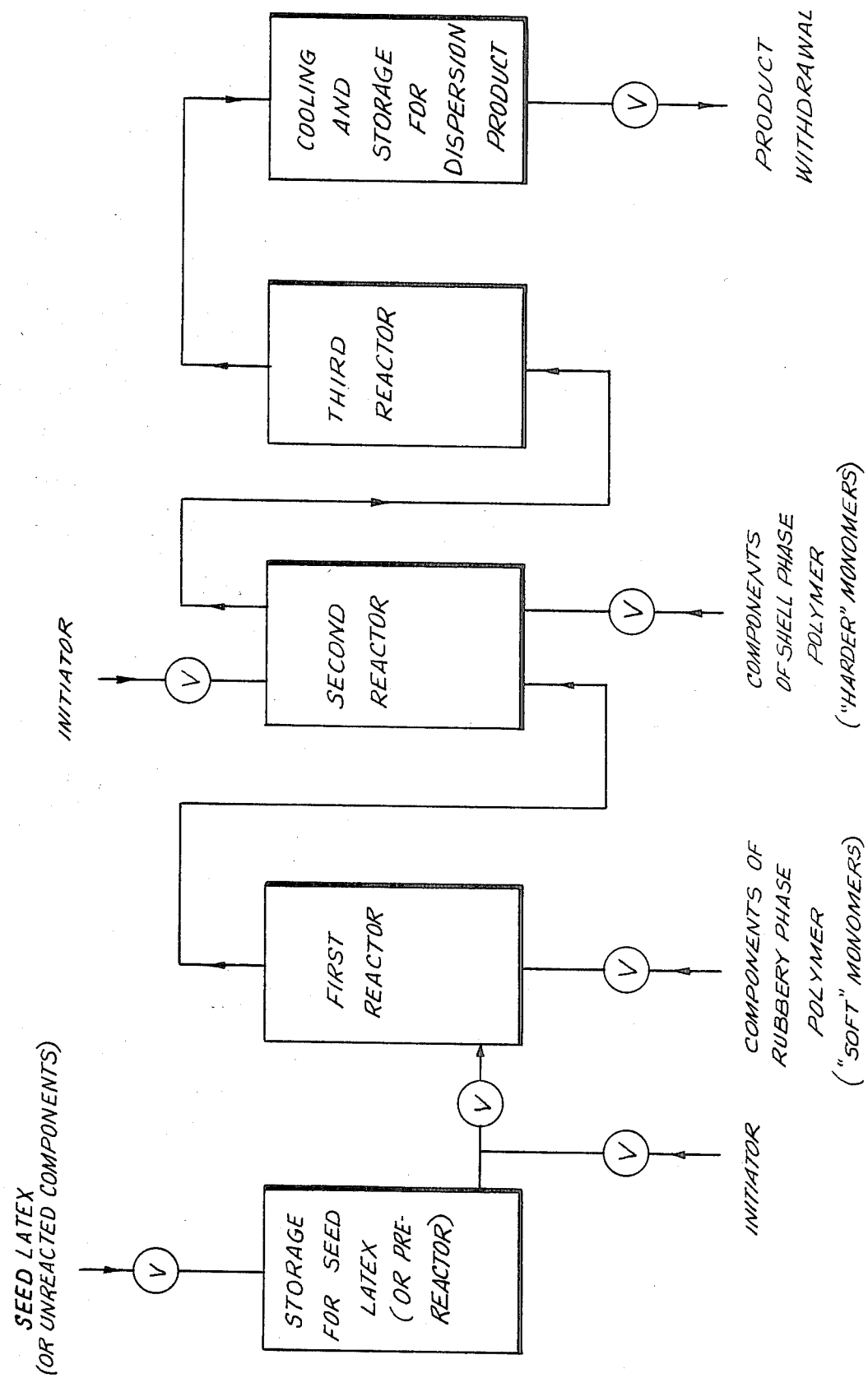

IMPACT RESISTANT RESINS AND METHOD FOR MAKING THE SAME

This is a continuation of application Ser. No. 407,913 filed Aug. 13, 1982, abandoned, which is in turn a continuation-in-part of application Ser. No. 209,516 filed Nov. 24, 1980, abandoned.

The present invention relates to a method for the continuous preparation of impact resistant resins and to the resins produced thereby.

More in particular the invention relates to producing impact resistant resins by means of an emulsion polymerization proceeding from a seed latex by the polymerization thereon of a rubbery phase and the subsequent polymerization thereon of a harder shell. The resulting resins are useful as impact resistant components of polymethacrylate forming masses.

Different routes have been proposed in the art for the preparation of impact resistant modifications of polymers or copolymers of ethylenically unsaturated monomers.

Thus, a method has been proposed in the prior art for the preparation of suspension polymers by the polymerization of polymerizable ethylenically unsaturated monomers in an aqueous dispersion in the presence of monomer-soluble catalysts, dispersing agents, and a polymer- or copolymer-latex. According to the method, the monomer fraction can comprise an alkyl acrylate having 1 to 8 carbon atoms in the alkyl portion in an amount from 1 to 50 percent, by weight of the finished polymer, together with from 0 to 50 percent, by weight of the alkyl acrylate, of a different monoethylenically unsaturated comonomer, and 0.01 to 10 percent, by weight of the total amount of monoethylenically unsaturated compounds, of a polyolefinical unsaturated compound. According to the aforementioned prior art, the polymer- or copolymer-latex comprises methyl methacrylate, styrene, a substituted styrene or acrylonitrile, or mixtures thereof, 0 to 50 percent, by weight of the total monomer content of the latex, of a further copolymerizable monoethylenically unsaturated compound, and 0 to 50 percent, by weight of the total monomer content of the latex, of a polyolefinically unsaturated compound.

A further method is proposed in the prior art for the preparation of core-shell polymers in which—in a first method step—crosslinked polystryene particles having a particle size of greater than 0.8 micron are prepared by an emulsion polymerization process and these polymer particles are surrounded—in a second method step—with a shell of polymethyl methacrylate or a copolymer predominantly comprising methyl methacrylate using a graft polymerization technique.

In the last mentioned prior art, it is stated that the copolymers prepared according to the method can be readily dispersed with uniform distribution and that they retain this ideal distribution also after working up of the forming masses by extrusion or injection molding.

However, the methods according to the state of the art are not fully satisfactory. In particular, the tack of developing a technical-scale method for the continuous preparation of impact resistant modified methyl methacrylate, particularly methyl methacrylate forming masses having a rubbery phase of butyl acrylatestyrene, had not been convincingly solved.

Among the problems which stand in the way of such a continuous technical realization are, for example, the relatively small reaction velocity of the styrene contained in the rubbery phase, which reaction velocity in turn determines the entire throughput velocity. To increase the reaction velocity to a sufficient value, an increase in the initiator concentration can be considered. At the same time, it becomes necessary to work with a higher concentration of emulsifier. For continuous operation, performing the reaction in several serially-arranged reactors, such as a cascade of stirred vessels, comes into consideration, for example.

Under the conditions described above, products can be prepared which have a satisfactory impact resistance and Vicat softening temperature, but they have a relatively low notch-impact resistance. For the most part, the optical properties of such products need improvement, probably because of the large concentrations of emulsifier and initiator which are employed and, presumably, as a result of an unfavorable particle size distribution brought about by back mixing.

It has now been found that impact resistant components for impact resistant polymethacrylate can be prepared by emulsion polymerization in a continuous method which meets technical demands in a particularly satisfactory way if a first reactor is loaded with a seed latex and an initiator, and a monomer component containing monomers which are considered "soft" from the point of view of their overall effect is added thereto together with an emulsifier. After a degree of polymerization from 80 to 95 percent (calculated on the added monomer component) is attained, the reaction mixture ("rubbery phase") is transferred to a second reactor. Without the further addition of emulsifiers during the remaining course of the method, then one or more acrylate- and/or methacrylate monomers is added as a harder shell-phase component. The polymers or copolymers of these monomers have a $T_{\lambda max}$ of at least 45° C. The monomers are polymerized with the further addition of an initiator and the dispersion so obtained is worked up in a manner known in the art.

The seed latex is not particularly critical from the point of view of its polymeric composition. It can advantageously comprise a polymer which is prepared by the polymerization or copolymerization of alkyl acrylates or alkyl methacrylates having 1 to 4 carbon atoms in the alkyl portion, optionally with 0 to 30 percent of a further different copolymerizable monomer, by weight of the total monomers. Advantageously, one of the conventional crosslinking agents, for example an acrylic compound having at least two reactive vinyl double bonds, is used. Among these are, for example, 1,4-butane-diol dimethacrylate, ethylene dimethacrylate, glycol dimethacrylate, triglycol dimethacrylate, trimethylol propane trimethacrylate, or allyl compounds such as allyl methacrylate or allyl cyanurate.

As a rule, the polymer of the seed latex has a $T_{\lambda max}$ greater than 45° C. ($T_{\lambda max}$ is to be determined according to DIN 53 445).

Taking into consideration the optical qualities of the impact resistant resins which are striven for in a majority of cases, attention must be paid to matching the refractive indices of the individual polymer components.

Advantageously, the average particle size in the seed latex is less than 5 nanometers.

According to a preferred embodiment, the seed latex may be a polymer of methyl methacrylate comprising from 0.5 to 5 percent, and especially about 1 percent, of a crosslinking agent such as 1,4-butanediol dimethacrylate, the percentage being based on the total weight of the monomers. A value of about 5 percent by weight is valid as a guide value for the amount of monomer to be used in the aqueous polymerization batch for the seed latex.

The seed latex can, for example, make up from 0.5 to 10 percent by weight of the total impact resistant resin. The seed latex can be prepared in a manner known per se by emulsion polymerization of the monomers in an aqueous medium in the presence of emulsifiers such as fatty alcohol sulfates (sodium lauryl sulfate) and appropriate initiators such as potassium- or ammonium-peroxydisulfate. As shown in the accompanying drawing, the seed latex emulsion can be prepared continuously in a pre-reactor or can be stored in a suitable vessel and from there provided to the first reactor.

The monomer component used as the "rubbery phase" should contain monomers which are "soft" from the point of view of their total effect. Primarily, alkyl acrylates having from 1 to 4 carbon atoms in their alkyl portion come into consideration. The amount and the nature of the alkyl acrylates in this component is so measured that a polymer having a $T_{\lambda max}$ of less than 45° C. forms. As a rule, the amount of these acrylates is from 70 to 90 percent, preferably 75 to 80 percent, by weight of the "rubbery phase" component. Butyl acrylate is particularly preferred. Further, the component can contain alkyl methacrylates having from 1 to 4 carbon atoms in the alkyl portion in an amount from 0 to 10 percent by weight and, in addition, styrene and/or styrene substituted by lower alkyl in amounts of from 5 to 30 percent by weight. The simultaneous presence of about 3 to 7 percent of methyl methacrylate, particularly of about 5 percent, and of 10 to 20 percent of styrene, particularly about 15 percent, by weight of the total component is preferred.

Further, the use of crosslinking agents is advantageous, for example those of the type described earlier herein, in amounts from 1 to 3 percent by weight. Preferably 1,4-butanediol dimethacrylate is used. Further, other monomers such as hydroxyloweralkylacrylates and/or -methacrylates can optionally be used in amounts from 0 to 10 percent by weight. Suitably, in the course of the method of the present invention, this component is added in the form of an aqeous emulsion to the seed latex present in the first reactor to which initiator has already been added.

As a rule, the aqueous emulsion of the aforementioned "rubbery phase" component contains about 40 percent by weight of monomers. As an emulsifier, fatty alcohol sulfates such as sodium lauryl sulfate can be used, for example. The amount of emulsifier advantageously is between 0.01 and 3 percent, preferably from 0.05 to 0.5 percent, by weight of the water present. As the initiator used in this first polymerization, advantageously sodium- or particularly potassium-peroxydisulfate is added, suitably in a very weakly alkaline solution, in a molar concentration from 0.001 to 0.008, preferably from 0.001 to 0.005, and particularly at 0.003. Also, redox catalyst systems known in the art, such as persulfate in combination with sodium bisulfite, rongalite, ascorbic acid, inter alia, can also be employed.

Suitably, the aqueous emulsion can be adjusted to a pH from about 6 to 8 by the addition of weak alkali. As the alkali, for example, 0.5N NaOH or KOH can be used. The addition of this "rubbery phase" component is advantageously so measured that the amount of polymer which it contributes is from 30 to 80 percent by weight of the impact resistant resin.

The polymerization of the "rubbery phase" in the first reactor is carried out at a temperature from 40° C. to 95° C. until a degree of polymerization from 80 to 95 percent is attained. Then, the "rubbery phase" contents of the first reactor are introduced into a second reactor and one or more acrylate- and/or methacrylate monomers, which in the form of their polymers have a $T_{\lambda max}$ of at least 45° C., are added as the "harder" component and, preferably, further initiator is subsequently added.

As the monomer of this "harder" or "shell phase" component, methyl methacrylate is preferably used, optionally with the addition of suitable comonomers such as ethyl acrylate. As a rule, the content of methyl methacrylate in the outer shell is at least 90 percent by weight. The amount of outer shell in the impact resistant resin prepared according to the present invention can be in the range from about 10 percent to about 70 percent by weight. Simultaneously with the shell material of this component, still other additives known per se, such as stabilizers inter alia, can be added. For example, thermal stabilizers such as sterically hindered phenols should be mentioned. The further initiator which may be added corresponds from the point of view of its chemical nature with the initiator used in the first polymerization. Also in this case, suitably a very weakly alkaline solution is employed.

The molar concentration of the second initiator is preferably in the range from 0.0001 to 0.001, particularly at 0.0003.

The polymerization is advantageously carried out in the presence of a chain transfer agent. The conventional materials (cf. Brandrup and Immergut, "Polymer Handbook", John Wiley and Sons, Second Edition) can be used. For example, the amount of such agents can be from 0.05 to 0.5 percent, preferably from 0.1 to 0.3 percent, by weight of the monomer content. Exemplary agents are thioglycolic acid-ethylhexyl ester, pentaerythritol tetrathioglycolate, etc.

The shell can be polymerized within a temperature range from 40° C. to 95° C. In the process, lower temperatures in the range are preferably employed when using a redox system; otherwise, the temperature is maintained in the upper region of the temperature range. After conclusion of the polymerization process, the dispersion of the impact resistant material which has been obtained can be introduced into a cooling and/or storage container. Further processing can follow in a manner known per se.

According to present experience, the maintenance of a degree of polymerization between 80 and 95 percent for the rubbery phase, before polymerizing the shell component thereon, must be viewed as critical for the physical properties of the impact resistant resin which are sought to be attained. Thus it appears, for example, that the achievement of a Vicat softening temperature of greater than 90° C., also after admixture with an acrylic glass such as polymethylmethacrylate, is connected with the observance of this condition.

The impact resistant resins prepared according to the invention are further distinguished by an advantageous impact strength and notch-impact strength. The advantageous optical properties of the materials prepared according to the present invention are to be emphasized, which properties are particularly evident after admixture of the materials with acrylic glass (polymethyl methacrylate). It appears to be necessary for achieving good optical properties that the amount of emulsifiers used, and secondarily the amount of initiators used, be limited to the aforementioned quantities.

In comparison with products of the same composition, but made by a discontinuous process, the impact resistant resins of the invention have a higher gloss. This has been attributed to a broader distribution of particle sizes in the resin, resulting from the continuous method by which the particles are made. Also, the continuously produced product has a thermal stability which is at least 30° (C.) higher than that of a corresponding discontinuously produced resin.

A better understanding of the present invention and of its many advantages will be had from the following Example, given by way of illustration.

EXAMPLE 1

As shown in the flow diagram in the accompanying drawing, the elements of a typical polymerization apparatus are a storage container of any suitable size for the seed latex, a three-stage cascade of stirred vessels comprising a first and second reactor each having a volume of 1.25 liters, for example, and a third reactor having a volume of 2.5 liters, for example, as well as a container of suitable size for storage of the finished dispersion.

An emulsion polymer is introduced into the storage container for the seed latex, which polymer has priorly been prepared by the polymerization, at 80° C., of an aqueous emulsion comprising water, methyl methacrylate (MMA), butanediol dimethacrylate (BDMA), sodium lauryl sulfate (NaLS), and potassium peroxydisulfate (PPS) in a parts by weight ratio of 94.8:5.05:0.05:0.1:0.003.

This seed latex, after admixture therewith of 101 grams/hour (g/h) of an initiator solution comprising water, PPS, and 0.5N NaOH in a parts by weight ratio of 96.5:0.85:2.6, is introduced in an amount of 299 g/h into a first reactor, which is at a temperature of 85°–95° C., with the simultaneous addition of 850 g/h of a rubbery phase component comprising an aqueous emulsion of water, butyl acrylate, styrene, MMA, BDMA, NaLS, and 0.5N NaOH in a ratio of 57.5:33.01:6.77:1.95:0.64:0.005:0.1.

By regulating the temperature using means not shown in the drawing, the polymerization in the first reactor is so directed that the reaction mixture produced in an amount of 1250 g/h per hour in the first reaction has a polymerization conversion of more than 80 percent and less than 95 percent, calculated on the monomers introduced, before it is introduced into a second stirred reactor which is also maintained at about 90° C. The shell phase polymer is formed by the addition of 360 g/h of a monomer mixture of MMA and thioglycolic acid-2-ethylhexyl ester in a ratio of 99.8:0.2 and by the addition of 840 g/h of an initiator solution comprising water, PPS, and 0.5N NaOH in a ratio of 99.67:0.08:0.25.

The polymer mixture exits from the second reactor in an amount which by this time is 2450 g/h into a third stirred vessel, also maintained at 90° C., for postpolymerization. The use of a third reactor for postpolymerization is optimal. It is not considered critical for the result of the process; it is, however, advantageous. From here it is conducted into a cooling- and storage-container as a 30 percent dispersion with a conversion of greater than 99.5 percent, calculated on the monomers introduced.

The dispersion prepared in this manner is worked up in a known fashion, by, for example, spray drying, coagulation with an electrolyte, and/or shearing for winning the resin.

As an alternative to the method described above, the seed latex can also be prepared continuously. In this case, the seed latex storage vessel is operated at 90° C. as a prereactor in which are continuously polymerized 299 g/h of a monomer emulsion comprising water, MMA, BDMA, NaLS, and PPS in a ratio by parts by weight of 94.8:5.05:0.05:0.1:0.003. After mixing with initiator, as described above, the seed latex is conducted to the first reaction.

A mixture containing 50 percent by weight of a polymer product produced by this Example with 50 percent by weight of polymethylmethacrylate has a Vicat softening temperature of 95° C.

What is claimed is:

1. A continuous emulsion polymerization method using a system of reactors for making an aqueous dispersion of an impact resistant resin having a Vicat softening temperature greater than 90° C. and thus adaptable to use as a component of impact resistant polymethacrylate forming masses, which method consists essentially of (1) in a first reactor, emulsion polymerizing a first monomer component comprising from 70 to 90 percent by weight of a $C_1$–$C_4$ alkyl acrylate, from 5 to 30 percent of styrene or lower alkyl-substituted styrene, 0 to 10 percent of a $C_1$–$C_4$ alkyl methacrylate, and 0 to 10 percent of at least one further different, copolymerizable, monomer, which first component when polymerized forms a rubbery polymer phase having a $T_{\lambda max}$ less than 45° C., onto core polymer particles of completely polymerized polymethyl methacrylate crosslinked with 0.5 to 10 percent of a crosslinking agent, in the presence of an initiator and an emulsifier to form an emulsion of particles of an intermediate product comprising said core polymer particles covered with a rubbery polymer phase, said core polymer particles having an average particle size of less than 5 nanometers, said polmerization being effected only until a degree of polymerization of said first monomer component to form said rubbery polymer phase of 80 to 95 percent is attained;

(2) transferring said emulsion of said intermediate product to a second reactor and emulsion polymerizing methyl methacrylate onto the particles of said intermediate product in the presence of unpolymerized portions of said first monomer component and of further added initiator but without addition of further emulsifier, whereby an emulsion of a further product comprising particles of said intermediate product covered with a shell of harder polymethyl methacrylate polymer is obtained; and then (3) transferring said emulsion of said further product to a third reactor and continuing polymerization to a degree of more than 99.5 percent.

2. An impact resistant resin product made by the continuous method of claim 1 and consisting of a plurality of particles each having (A) an innermost core which is from 0.5 to 10 percent by weight of said particle and is polymethyl methacrylate crosslinked with 0.5 to 5 percent of a crosslinking agent (B) an intermediate shell of a rubbery copolymer surrounding said innermost core, which copolymer is from 30 to 80 percent by weight of said particle and comprises from 70 to 90 percent, by weight of said copolymer, of an alkyl acrylate having from 1 to 4 carbon atoms in the alkyl portion thereof, from 5 to 30 percent by weight of a member selected from the group consisting of styrene and styrene substituted by lower alkyl, 0 to 10 percent by weight of an alkyl methacrylate having 1 to 4 carbon atoms in the alkyl portion thereof, and 0 to 10 percent by weight of at least one further monomer different from and copolymerizable with the aforementioned monomers, and (C) an outermost shell of polymethyl methacrylate.

3. A continuous emulsion polymerization method using a system of reactors for making an aqueous dispersion of an impact resistant resin having a Vicat softening temperature greater than 90° C. and thus adaptable to use as a component of impact resistant polymethacrylate forming masses, which method consists essentially of (1) in a first reactor, emulsion polymerizing a first monomer component comprising 75 to 85 percent by weight of butyl acrylate, 10 to 20 percent of styrene, 2 to 10 percent of methyl methacrylate, and 1 to 3 percent of a crosslinking agent, which first component when polymerized forms a rubbery polymer phase having a $T_{\lambda max}$ less than 45° C., onto core polymer particles of completely polymerized polymethyl methacrylate crosslinked with 0.5 to 5 percent of a crosslinking agent, in the presence of an initiator and an emulsifier to form an emulsion of particles of an intermediate product comprising said core polymer particles covered with a rubbery polymer phase, said core polymer particles having an average particle size of less than 5 nanometers and comprising polymethyl methacrylate crosslinked with 0.5 to 5 percent of a crosslinking agent, said polymerization being effected only until a degree of polymerization of said first monomer component to form said rubbery polymer phase of 80 to 95 percent is attained;

(2) transferring said emulsion of said intermediate product to a second reactor and emulsion polymerizing methyl methacrylate onto the particles of said intermediate product in the presence of unpolymerized portions of said first monomer component and of further added initiator but without addition of further emulsifier, whereby an emulsion of a further product comprising particles of said intermediate product covered with a shell of harder polymethyl methacrylate is obtained; and then (3) transferring said emulsion of said further product to a third reactor and continuing polymerization to a degree of more than 99.5 percent.

4. An impact resistant resin product made by the continuous method of claim 3 and consisting of a plurality of particles each having (A) an innermost core which is from 0.5 to 10 percent by weight of said particle and is polymethyl methacrylate crosslinked with 0.5 to 5 percent of a crosslinked agent, (B) an intermediate shell of a rubbery copolymer surrounding said innermost core, which copolymer is from 30 to 80 percent by weight of said particle and comprises 75 to 85 percent, by weight of said copolymer, of butyl acrylate, 10 to 20 percent by weight of styrene, 2 to 10 percent by weight of methyl methacrylate, and 1 to 3 percent by weight of a crosslinking agent, and (C) an outermost shell of polymethyl methacrylate.

5. The method as in claim 1 wherein the polymer present in said seed latex is from 0.5 to 10 percent of the weight of said impact resistant resin.

6. The method as in claim 1 wherein the polymer present in said seed latex is from 1 to 5 percent of the weight of said impact resistant resin.

7. The method as in claim 1 wherein said first monomer component is from 30 to 80 percent by weight of said impact resistant resin.

* * * * *